United States Patent
Collins

[19]

[11] Patent Number: 6,056,242
[45] Date of Patent: May 2, 2000

[54] PARACHUTE RELEASE APPARATUS AND METHOD

[75] Inventor: Kyle B. Collins, Deland, Fla.

[73] Assignee: William R. Booth, Deland, Fla.

[21] Appl. No.: 09/159,665

[22] Filed: Sep. 24, 1998

Related U.S. Application Data

[60] Provisional application No. 60/060,104, Sep. 26, 1997.

[51] Int. Cl.[7] .................................................. B64D 17/38
[52] U.S. Cl. ....................... 244/151 B; 244/147; 244/149
[58] Field of Search .................... 244/147, 149, 244/151 B

[56] References Cited

U.S. PATENT DOCUMENTS

| | | | |
|---|---|---|---|
| 3,464,653 | 9/1969 | Basnett | 244/151 B |
| 3,765,627 | 10/1973 | Snyder | 244/151 B |
| 3,934,848 | 1/1976 | Snyder | 244/151 B |
| 4,030,689 | 6/1977 | Rodriguez | 244/151 B |
| 4,262,865 | 4/1981 | Smith | 244/151 B |
| 4,337,913 | 7/1982 | Booth | 244/151 B |
| 4,428,102 | 1/1984 | Brownell | 244/151 B |
| 4,746,084 | 5/1988 | Strong | 244/151 B |
| 4,923,150 | 5/1990 | Calkins et al. | 244/151 B |

*Primary Examiner*—J. Woodrow Eldred
*Attorney, Agent, or Firm*—Allen, Dyer, Doppelt, Milbrath & Gilchrist, P.A.

[57] ABSTRACT

A parachute releasing apparatus is operable with a reserve static line for automatically releasing one riser after failure of a second riser, thus avoiding entanglement of the main parachute with the reserve parachute. First and second risers of the main parachute are releasably attached to a harness through quick releases devices for each riser. The reserve static line is connected between the first riser of the main parachute and a deployment pin of the reserve parachute. A connection is made between the first riser of the main parachute and the quick release device of the second riser for automatically releasing the second riser from the harness prior to the reserve static line deploying the reserve parachute. Thus, the main parachute is released from the harness before the reserve parachute deploys and avoids entanglement of the failed main parachute with the reserve parachute.

48 Claims, 5 Drawing Sheets

PARACHUTE RELEASE APPARATUS AND METHOD

CROSS REFERENCE TO RELATED APPLICATION

This Application is related to Provisional Application having Ser. No. 60/060,104, filed on Sep. 26, 1997, for APPARATUS TO INSURE COMPLETE MAIN PARACHUTE RELEASE PRIOR TO RESERVE DEPLOYMENT ACTIVATED BY A RESERVE STATIC LINE, commonly owned with the instant application.

FIELD OF INVENTION

The invention relates generally to parachutes and parachute release systems, and more particularly to release of a main parachute prior to deployment of a reserve parachute.

BACKGROUND OF THE INVENTION

Parachute systems will typically includes a main parachute and a reserve parachute as a backup in the event of main parachute failure. The main parachute assembly will include a quick release mechanism so that the main canopy can be released from the body harness warn by the parachutist or jumper in case of main parachute failure or malfunction. It is usually necessary that the main parachute be completely released or disconnected from the body harness before the reserve parachute is deployed in order to avoid entanglement, and fatal results. Quick release devices are described in U.S. Pat. No. 4,337,913 to Booth and U.S. Pat. No. 4,428,102 to Brownell, by way of example.

In addition to the main parachute releases, Reserve Static Line (RSL) Systems have been used in sport parachuting for many years. Their purpose is to open the reserve parachute container immediately upon a "cutaway" or release of the main parachute, in the event of its malfunction. The RSL typically includes a cord attached at one end to one main parachute riser, and at the other end to the ripcord of the reserve parachute.

An RSL functions well if both main parachute risers release simultaneously. However, if only the riser to which the RSL is connected releases, and the other main parachute riser remains attached to the jumper's harness, the RSL will deploy the reserve parachute which can open into the partially connected main parachute, possibly resulting in entanglement, thus leading to possible injury or death. Accordingly, it is vital that the main parachute be fully released to protect the jumper from possible disaster.

Attempts have been made to overcome this shortcoming. By way of example, one approaches tried in the past includes the use of two RSL's, one from each main riser, connected to two reserve ripcord pins. However, both main risers must be jettisoned before the reserve will be deployed. Another approach involves the use of a cross connector between both main risers that will not allow either riser to go very far without the other. Although such approaches will work, they are awkward to assemble and both create new malfunction possibilities just as hazardous the problem they are trying to prevent.

SUMMARY OF INVENTION

In view of the foregoing background, it is therefore an object of the invention to provide the parachutist with complete separation from the main parachute assembly prior to activation of the reserve parachute by the reserve static line. It is further an object to provide for an automatic release of the main parachute when the timing of such a release requires split-second performance unlikely to be accomplished manually by the jumper. It is further an object of the invention to cause the release of one main parachute when a failure causes the release of an opposing riser, prior to the deployment of a reserve parachute for avoiding entanglement of the reserve parachute with the main parachute. This and other objects, advantages and features of the present invention are provided by an automatic release assembly the employs a connection between the main parachute riser equipped with an RSL and the release cable of the non-RSL main parachute riser. In essence, the present invention provides for the automatic release of the non-RSL main parachute riser upon release of the RSL main parachute riser, thus avoiding any entangling of the reserve parachute with the main parachute.

A parachute releasing apparatus of the present invention includes first and second risers operable with a first parachute, a harness, first and second attaching means releasably attaching the first and second risers, respectively, to the harness, a second parachute including deployment means for deploying the second parachute, a reserve static line connected between the first riser of the first parachute and the deploying means of the second parachute, and connecting means for connecting the first riser of the first parachute to the second riser attaching means. The connecting means is operable with the second riser attaching means for causing the second riser to be released from the harness prior to the reserve static line deploying the second parachute, thus releasing the first parachute from the harness for avoiding entanglement of the first parachute with the second parachute.

A method aspect of the present invention includes a method of rigging a parachute assembly comprising the steps of providing a first parachute having first and second risers for attaching to a body harness, attaching first and second releasably attaching means between the first and second risers and the body harness, respectively, providing a second parachute including deployment means for deploying the second parachute, affixing a reserve static line between the first riser and the deployment means for deploying the second parachute upon failure of the first riser, and connecting the first riser of the first parachute to the second attaching means for operating with the second riser attaching means for releasing the second riser from the harness prior to the reserve static line deploying the second parachute, thus releasing the first parachute from the harness for avoiding entanglement of the first parachute with the second parachute.

BRIEF DESCRIPTION OF DRAWINGS

A preferred embodiment of the invention as well as alternate embodiments are described by way of example with reference to the accompanying drawings in which.

DETAILED DESCRIPTION OF THE PREFERRED EMBODIMENTS

The present invention will now be described more fully herein after with reference to the accompanying drawings, in which preferred embodiments of the invention are shown This invention may, however, be embodied in many different forms and should not be construed as limited by the embodiments set forth herein. Rather, these embodiments are provided so that this disclosure will be thorough and complete, and will fully convey the scope of the invention to those of ordinary skill in the art. Like numbers refer to like elements throughout.

Figure 1:
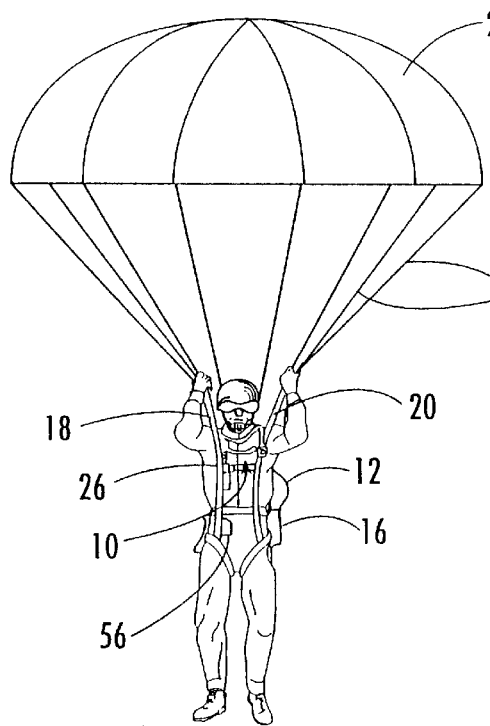
FIG. 1 is a front view of a jumper operating a deployed main parachute.
Figure 2:
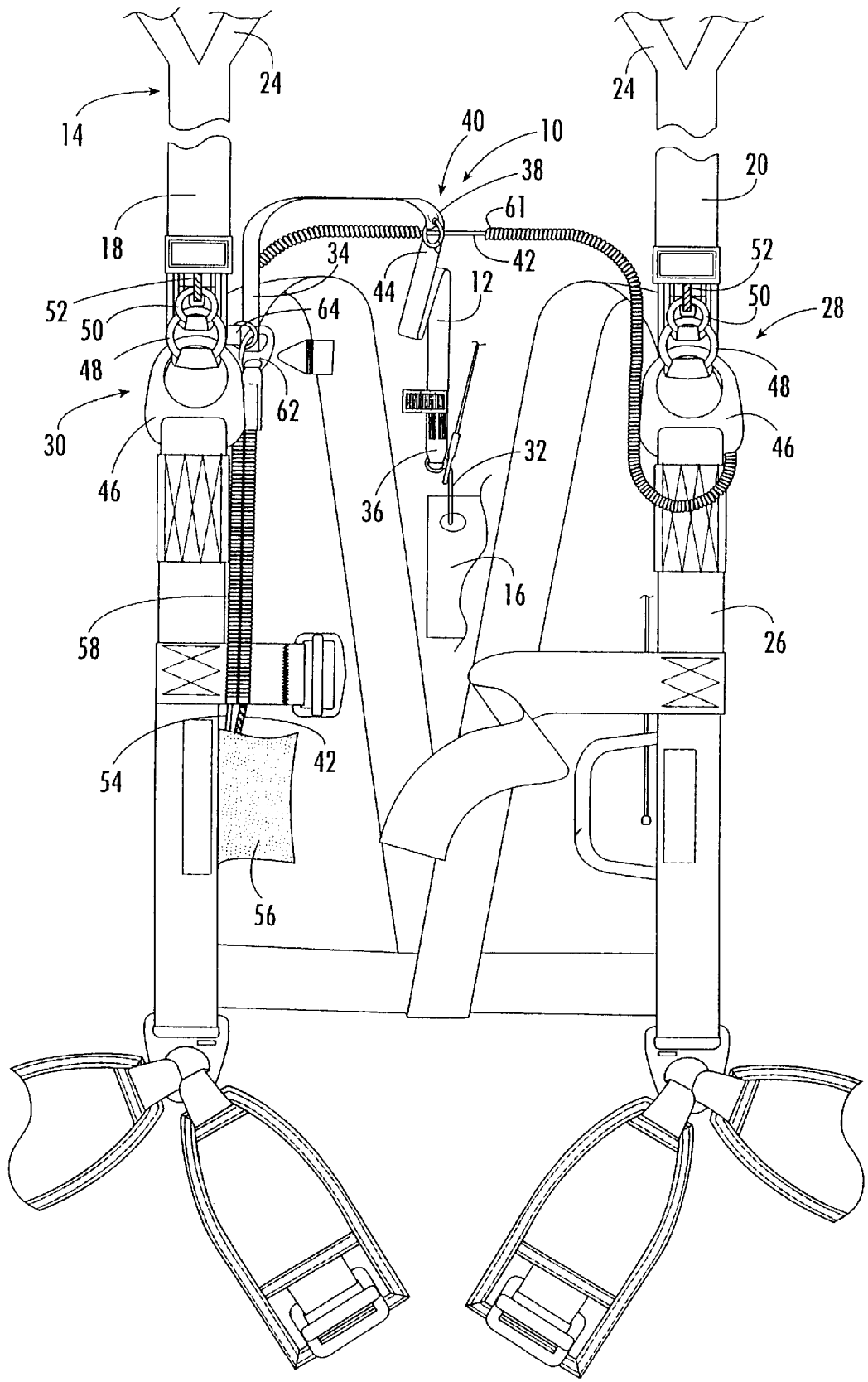
FIG. 2 is a partial front perspective view of a parachute harness assembly illustrating a preferred embodiment of the present invention.

Referring now initially to FIGS. 1 and 2, a parachute releasing apparatus 10 is operable with a reserve static line (RSL) 12, which RSL is connected for operation between a first parachute, a main parachute 14 as herein described by way of example, and a second parachute, a reserve parachute 16, as herein described by way of example. Operation with other parachute combinations, such as in tandem assemblies are also applicable. Typically, the main parachute 14 includes a first riser, herein described as a right riser 18, and a second riser, a left riser 20 connected to the main parachute canopy 22 with suspension lines 24. The risers 18, 20 are attached to a harness 26 by left and right attaching means such as the three ring release devices 28, 30 as will be herein described by way of example. It is to be understood that alternate riser release assemblies can also be used with the present invention. The reserve parachute 16 includes deployment means comprising a closing pin 32 for initiating the deploying of the reserve parachute.

As illustrated with reference again to FIG. 2, the reserve static line (RSL) 12 includes a proximal end 34, a distal end 36, and an intermediate area 38 therebetween, wherein the proximal end is connected to the right riser 18 of the main parachute 14 and the distal end is connected to the closing pin 32, the deploying means, of the reserve parachute 16. Connecting means 40 connects the right riser 18 to a left riser release cable 42 operable with the left three ring device 28, the attaching means for the left riser 20. The connecting means 40 is operable with the left riser attaching means 28 for causing the left riser 20 to be released from the harness 26 prior to the reserve static line (RSL) 12 deploying the reserve parachute 16, as illustrated with reference to FIG. 3. Thus, the main parachute 14 is automatically and fully released from the harness 26 for avoiding entanglement of the failed main parachute 14 with a deployed reserve parachute, a hazard not unknown in the art of sky diving and parachuting.

In one preferred embodiment of the present invention, and as illustrated again with reference to FIGS. 2 and 3, the parachute releasing apparatus 10 is integrally formed with the RSL 12, wherein the connecting means 40 comprise a connector ring 44 attached between the release cable 42 of the left riser attaching means 28 and the intermediate area 38 of the RSL 12. The connection ring 44 is rotatably attached to the intermediate area 38 of the RSL 12 and slidably receives the left release cable 42 therethrough.

Figure 4:
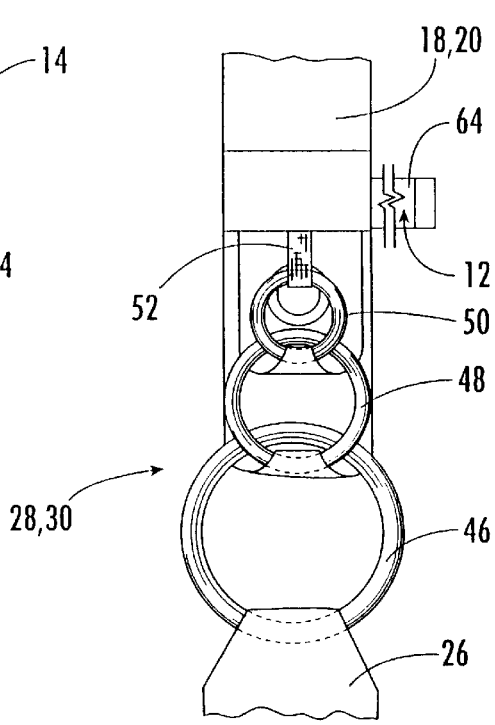
FIGS. 4 and 5 are front and side views of a three ring main parachute release assembly typically used in the art.
Figure 5:
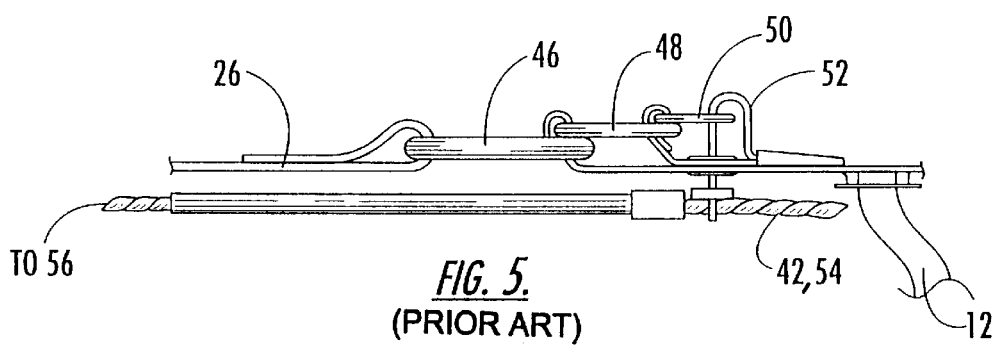
Figure 6:
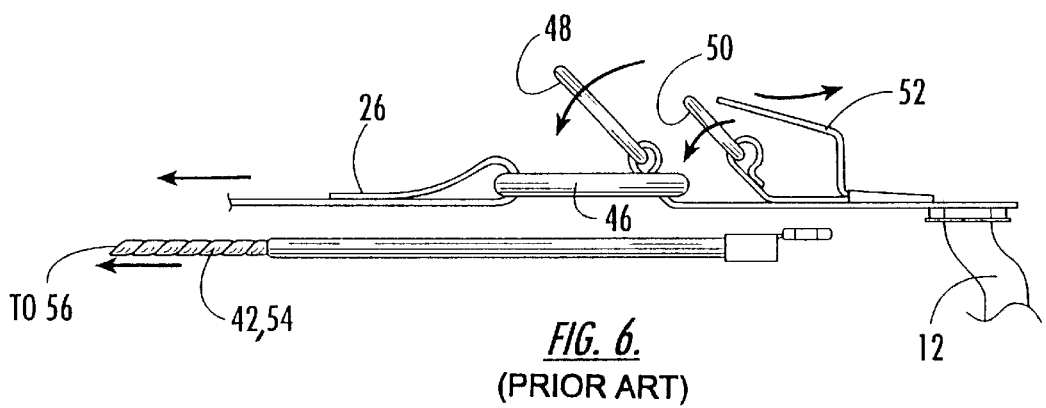
FIG. 6 is the release assembly of FIG. 4 in a releasing position.

As herein described, by way of example, the main parachute 14 is attached to the harness 26 at main parachute attachment three ring devices 28, 30. The connection between the main parachute risers 18, 20 and the harness 26 is made using the easily releasable three ring device as described in U.S. Pat. No. 4,337,913 to Booth, and as illustrated herein with reference to FIGS. 4–6, and again with reference to FIGS. 2 and 3. Each of the left and right attaching means, three ring devices 28, 30 typically comprise a first ring 46 attached to the harness 26. A second ring 48 is rotatably attached to the riser 18, 20. The second ring 48 passes through the first ring 46 for removably connecting the first ring and thus the harness 26 to the riser 18, 20. A third ring 50 is rotatably attached to the riser 18, 20. The third ring 50 is operable with the second ring 48 and passes through the second ring for removably securing thereto. A loop 52, of nylon material is the embodiment herein described, passes through the third ring 50, and a release cable, such as the release cable 42 earlier described, slidably passes through the loop 52 for releasably securing the loop to the third ring 50, as illustrated with reference again to FIGS. 4, and 5. As illustrated, by way of example, with reference again to FIG. 6, removal of the release cable 42 from the loop 52 initiates serial release of the third ring 50 from the second ring 48, and from the first ring 46, thus releasing the riser 18, 20 from the harness 26.

Each of the left and right riser attaching means 28, 30 comprise release cable 42, 54 defined by a proximal end positioned for operation with a handle 56 to be pulled for effecting release of the risers 18, 20 from the harness 26, as the release cable distal ends slidably pass through the loop 52 as described. A normal release of both the right and left main parachute risers 18, 20 is achieved by pulling the riser release handle 56, thus extracting the release cables 42, 54 from the nylon closing loops 52 securing the three ring release devices 28, 30.

In one embodiment, the right side release cable 54 is guided through a protective, steel cable housing 58. Likewise, the left main parachute riser three ring release cable 42 is also guided through a protective, steel cable housing 60. It should be noted that these protective housings 58, 60 may be made of steel, fabric, or other protective material as desired. As illustrated with reference again to FIGS. 2 and 3, one embodiment of the present invention includes the left riser side cable housing 60 having a separation forming an opening 61 therein for providing access to the release cable 42, through which opening the connection ring 44 passes for slidably receiving the release cable therethrough.

As illustrated with reference again to FIGS. 2 and 3, the RSL 12, in one preferred embodiment is connected to the right main parachute riser 18 with a quick release shackle 62 fastened to a RSL attachment 64 on the right riser 18. The other end of the RSL lanyard is connected to the closing pin 32 typically found on a container for the reserve parachute. In a preferred embodiment of the present invention, as described with reference to FIGS. 2 and 3, the releasing apparatus 10, an automatic releasing apparatus, is located approximately midway between ends of the RSL 12. A metal connector ring 44 is preferred, however, other appropriate loops or rings are useable.

Figure 3:
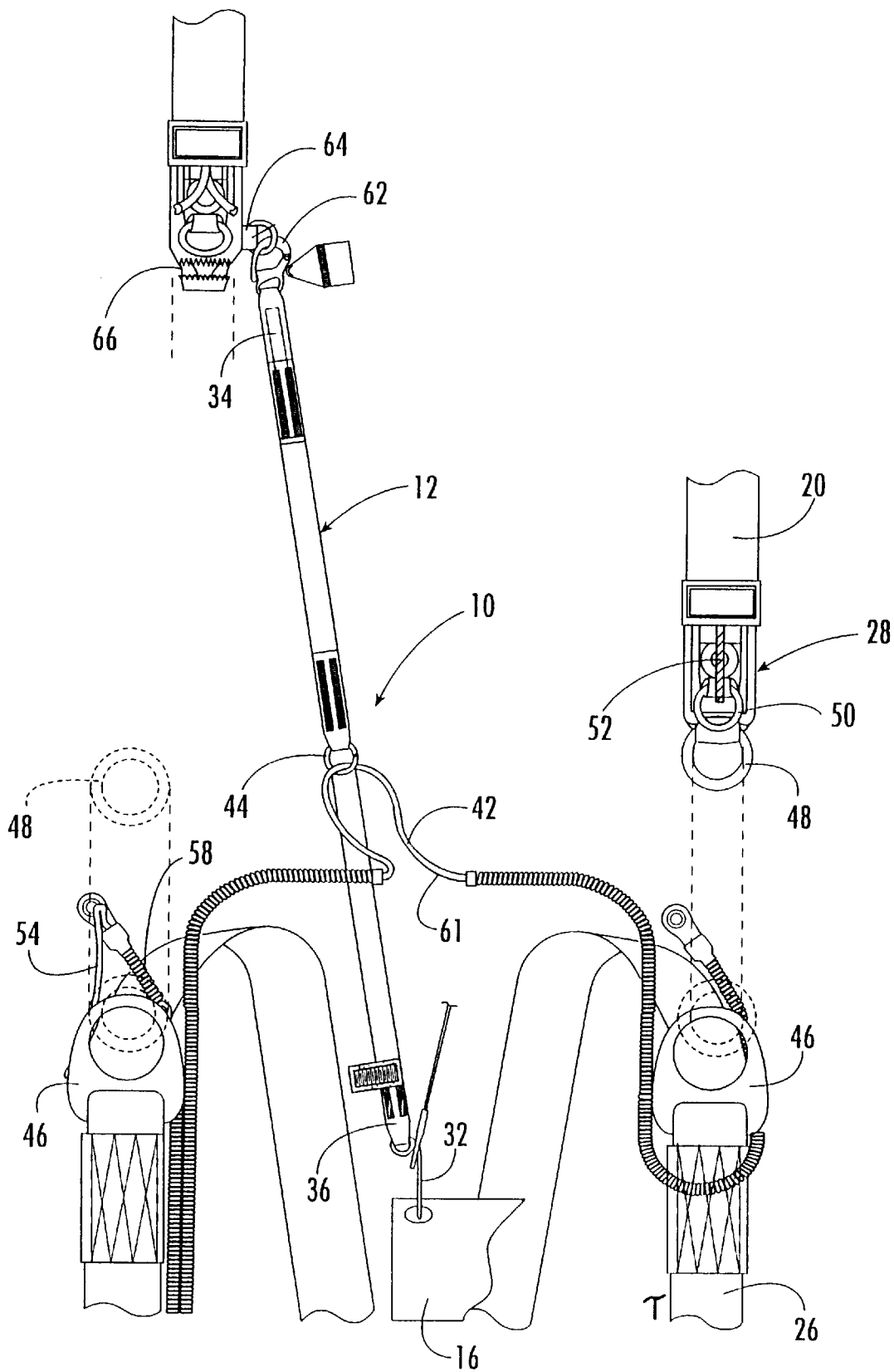
FIG. 3 is a partial front perspective view of the embodiment of FIG. 2 illustrating an automatic release of one main parachute riser after failure of another main parachute riser.

In operation, and by way of example, FIG. 3 illustrates the right main riser 18 broken at attachment point 66, one anticipated failure, for illustrating a function of the automatic riser release apparatus 10. The right riser 18 has broken and is prematurely released from the main parachute attachment ring 46, prematurely meaning that the parachutist has not yet pulled the riser release handle 56. In the example shown, the second ring 48 has disengaged and has likely been ejected to places unknown. The RSL 12 is fully extended, at a full stretch, and the automatic riser release apparatus 10 has extracted the left side release cable 42, thus releasing the left riser 20 prior to the RSL withdrawing the reserve container closing pin 32. It is anticipated that alternate locations for the connection of a RSL and apparatus will come to the mind of those skilled in the art wishing to provide the safe and automatic release of one parachute before a second parachute is deployed. The embodiment herein described provides a connection of a single RSL to the right riser, but connection to the left riser is an alternate embodiment. In the example illustrated, should failure occur in the riser not operable with the RSL, the parachutist will have sufficient time to manually effect release of the other riser without fear of automatic deployment of the reserve parachute, and possible entanglement of parachutes.

Figure 7:
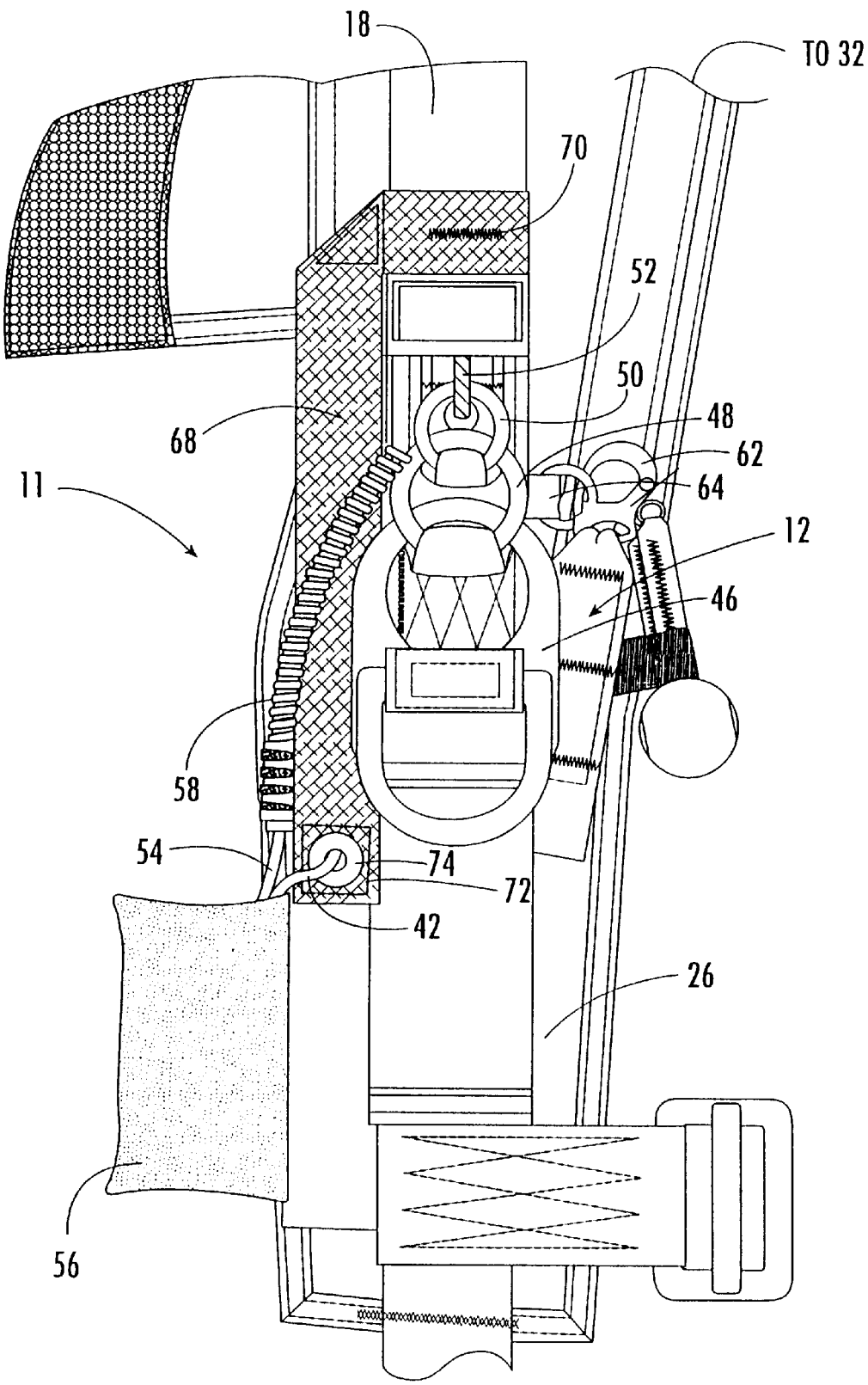
FIG. 7 is a partial front perspective view of a parachute harness assembly illustrating another preferred embodiment of the present invention.
Figure 8:
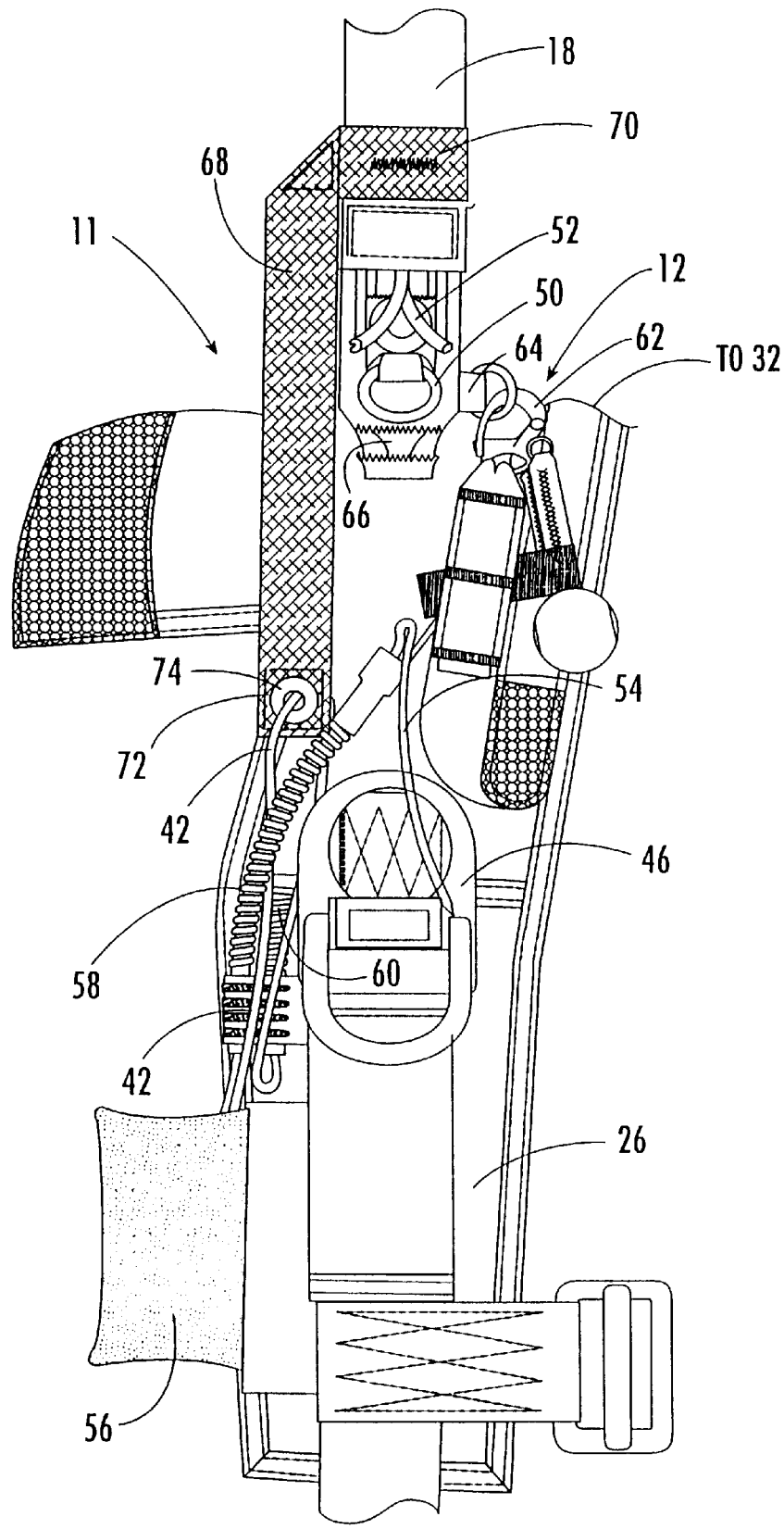
FIG. 8 is a partial front perspective view of the embodiment of FIG. 7 illustrating a failure of a main parachute riser.

With reference now to FIGS. 7 and 8, an alternate embodiment of the releasing apparatus 10, designated as releasing apparatus 11, wherein the connecting means now comprise a lanyard 68 having a proximal end 70 fixedly attached to the right riser 18 and a distal end 72 slidably attached to the left riser release cable 42. A grommet 74 is attached to the lanyard distal end 72 for slidably receiving the left release cable 42 therethrough. As herein illustrated, the automatic riser release apparatus 11 and the RSL 12 are not integrated as earlier described and are embodied as separate and distinct elements. The left release cable 42 passes through the grommet 74 before entering the left side release cable housing. It is anticipated that a loop or ring can successfully replace the grommet. Other elements of this embodiment are as described earlier with like elements having like identifying numeral.

As illustrated with reference to FIG. 8, a main parachute failure is described by a broken right main riser 18, at broken attachment point 66, and illustrates the function of the apparatus 11. The right main riser 18 has broken and prematurely released from the main parachute attachment ring 46. As the right main riser 18 releases, the automatic riser release apparatus 11 immediately begins to extract the left side release cable 42 from its housing 60, as further illustrated in FIG. 8. The extraction of this cable 42 releases the left main parachute riser 20 prior to the deployment of the reserve parachute 16 activated by the RSL 12, as earlier described with reference to FIGS. 2 and 3.

As earlier described, the concept of the automatic riser release apparatus 11 is applicable whether the RSL 12 attachment is on the right, as herein described, or left side main parachute riser. It is also applicable whether the riser release handle 56 is on the right, as shown in all figures, or left side of the harness 26. The construction of the automatic riser release apparatus may vary depending on the setup of the RSL and the riser release handle. Also, whether the automatic riser release apparatus is connected to the RSL, as shown in FIGS. 2 and 3, or connected to the main parachute riser containing the RSL attachment, as shown in FIGS. 7 and 8, will depend on the desired setup of the RSL and riser release handle.

Accordingly, many modifications and other embodiments of the invention will come to the mind of one skilled in the art having benefit of the teachings presented in the foregoing descriptions and the associated drawings. Therefore, it is to be understood that the invention is not to be limited to the specific embodiments disclosed, and that modifications and alternate embodiments are intended to be included within the scope of the appended claims.

That which is claimed is:

1. A parachute releasing apparatus comprising:

first and second risers operable with a first parachute;

a harness;

first and second attaching means releasably attaching the first and second risers, respectively, to the harness;

a second parachute including deployment means for deploying the second parachute;

a reserve static line having a proximal end, a distal end, and an intermediate area therebetween, wherein the proximal end is connected to the first riser of the first parachute and the distal end is connected to the deploying means of the second parachute; and connecting means for connecting the first riser of the first parachute to the second riser attaching means, the connecting means operable with the second riser attaching means for causing the second riser to be released from the harness prior to the reserve static line deploying the second parachute, thus releasing the first parachute from the harness for avoiding entanglement of the first parachute with the second parachute.

2. The parachute releasing apparatus according to claim 1, wherein the connecting means comprise a connector attached between the second riser attaching means and the intermediate area of the reserve static line.

3. The parachute releasing apparatus according to claim 1, wherein the connecting means comprise a lanyard having a proximal end fixedly attached to the first riser and a distal end slidably attached to the second riser attaching means.

4. The parachute releasing apparatus according to claim 1, wherein each of the first and second attaching means comprises:

a first ring attached to the harness;

a second ring rotatably attached to the riser, the second ring passing through the first ring for removably connecting the first ring and thus the harness to the riser;

a third ring rotatably attached to the riser, the third ring operable with the second ring and passing through the second ring for removably securing the second ring;

a loop passing through the third ring; and a release cable slidably passing through the loop for releasably securing the loop to the third ring, wherein removal of the cable from the loop initiates serial release of the third and second rings from the first ring, thus releasing the riser from the harness.

5. The parachute releasing apparatus according to claim 4, wherein each of the first and second riser attaching means comprise the release cable defined by a proximal end, a distal end, and an intermediate portion, the proximal end positioned for operation with a handle to be pulled for effecting release of the risers from the harness, the distal end slidably passing through the loop.

6. The parachute releasing apparatus according to claim 5, wherein the connecting means comprise a connection ring rotatably attached to the intermediate area of the reserve static line, the connection ring slidably receiving the second riser release cable therethrough.

7. The parachute releasing apparatus according to claim 6, further comprising a cable housing carrying the second release cable, the cable housing extending generally along the full cable length, the cable housing having an opening therein, through which opening the connection ring passes for slidably receiving the cable.

8. The parachute releasing apparatus according to claim 5, wherein the connecting means comprise a lanyard having a proximal end affixed to the first riser and a distal end slidably attached to the second riser release cable.

9. The parachute releasing apparatus according to claim 7, further comprising a grommet attached to the lanyard distal end, the grommet slidably receiving the second riser release cable therethrough.

10. The parachute releasing apparatus according to claim 1, wherein the first and second parachutes comprise main and reserve parachutes, respectively.

11. A parachute releasing apparatus comprising:
first and second risers operable with a first parachute and connected to a harness by first and second attaching means, respectively, the first and second attaching means releasably attaching each riser to the harness;
deploying means for deploying a second parachute;
a reserve static line having a proximal end connected to the first riser of the first parachute and a distal end connected to the deploying means of the second parachute; and
connecting means for connecting the first riser of the first parachute to the second riser attaching means, the connecting means operable with the second attaching means for causing the second riser to be released from the harness prior to the reserve static line deploying the second parachute.

12. The parachute releasing apparatus according to claim 11, wherein the connecting means comprise a connector attached between the second riser attaching means and the reserve static line.

13. The parachute releasing apparatus according to claim 12, wherein the connector is attached to the reserve static line at an area intermediate the proximal and distal ends.

14. The parachute releasing apparatus according to claim 11, wherein the connecting means comprise a lanyard having a proximal end fixedly attached to the first riser and a distal end slidably attached to the second riser attaching means.

15. The parachute releasing apparatus according to claim 11, wherein each of the first and second attaching means comprises:
a first ring attached to the harness;
a second ring rotatably attached to the riser, the second ring passing through the first ring for removably connecting the first ring and thus the harness to the riser;
a third ring rotatably attached to the riser, the third ring operable with the second ring and passing through the second ring for removably securing the second ring;
a loop passing through the third ring; and
a release cable slidably passing through the loop for releasably securing the loop to the third ring, wherein removal of the cable from the loop initiates serial release of the third and second rings from the first ring, thus releasing the riser from the harness.

16. The parachute releasing apparatus according to claim 15, wherein each of the first and second riser release cables have a proximal end, a distal end, and an intermediate portion, the proximal end positioned for operation with a handle to be pulled for effecting release, the distal end slidably passing through the loop.

17. The parachute releasing apparatus according to claim 15, wherein the connecting means comprise a connection ring rotatably attached between the proximal and distal ends of the reserve static line, the connection ring slidably receiving the second riser release cable therethrough.

18. The parachute releasing apparatus according to claim 17, further comprising a cable housing for each of the release cables, each cable housing extending generally along each cable length, the cable housing for the second attaching means having an opening, through which opening the connection ring passes for slidably receiving the cable.

19. The parachute releasing apparatus according to claim 11, wherein the connecting means comprise a lanyard having a proximal end affixed to the first riser and a distal end slidably connected to the second riser release cable.

20. The parachute releasing apparatus according to claim 19, further comprising a grommet attached to the lanyard distal end, the grommet slidably receiving the second riser release cable therethrough.

21. The parachute releasing apparatus according to claim 11, wherein the first and second parachutes comprise main and reserve parachutes, respectively.

22. A parachute releasing apparatus comprising:
a reserve static line having a proximal end for affixing to a first riser of a first parachute, the first parachute having first and second risers attached to a harness through first and second attaching means, respectively, the reserve static line having a distal end for affixing to deploying means of a second parachute; and
connecting means for connecting the first riser to the attaching means of the second riser, the connecting means for operation with the attaching means of the second riser for causing the second riser to be released from the harness prior to the reserve static line deploying the second parachute.

23. The parachute releasing apparatus according to claim 22, wherein the connecting means comprise a connector for attaching between the second riser attaching means and an intermediate area of the reserve static line between the proximal and distal ends therein.

24. The parachute releasing apparatus according to claim 23, wherein the connector comprises a ring.

25. The parachute releasing apparatus according to claim 22, wherein the connecting means comprise a lanyard having a proximal end for fixedly attaching to the first riser and a distal end for slidably attaching to the attaching means of the second riser.

26. The parachute releasing apparatus according to claim 22, wherein the connecting means comprise a lanyard having a proximal end for affixing to the first riser and a distal end for slidably attaching to the attaching means of the second riser.

27. The parachute releasing apparatus according to claim 26, wherein the length of the lanyard is shorter than the length of the reserve static line.

28. The parachute releasing apparatus according to claim 22, wherein the first and second parachutes comprise main and reserve parachutes, respectively.

29. A method of rigging a parachute assembly comprising the steps of:
providing a first parachute having first and second risers for attaching to a body harness;
attaching first and second releasably attaching means between the first and second risers and the body harness, respectively;
providing a second parachute including deployment means for deploying the second parachute;
affixing a reserve static line between the first riser and the deployment means for deploying the second parachute upon failure of the first riser; and
connecting the first riser of the first parachute to the second attaching means for operating with the second riser attaching means for releasing the second riser from the harness prior to the reserve static line deploying the second parachute, thus releasing the first parachute from the harness for avoiding entanglement of the first parachute with the second parachute.

30. The rigging method parachute according to claim 29, wherein the first riser connecting step comprises the step of providing a connector ring for connecting the reserve static line to the second attaching means.

31. The rigging method according to claim 29, wherein the first riser connecting step comprises the step of providing a lanyard having a proximal end fixedly attached to the first riser and a distal end slidably attached to the second attaching means.

32. The rigging method according to claim 29, wherein each of the first and second attaching means comprises:
 a first ring attached to the harness;
 a second ring rotatably attached to the riser, the second ring passing through the first ring for removably connecting the first ring and thus the harness to the riser;
 a third ring rotatably attached to the riser, the third ring operable with the second ring and passing through the second ring for removably securing the second ring;
 a loop passing through the third ring; and
 a release cable slidably passing through the loop for releasably securing the loop to the third ring, wherein the step of releasing the second riser includes the step of removing the cable from the loop for initiating serial releasing of the third and second rings from the first ring, thus releasing the second riser from the harness.

33. The rigging method according to claim 32, wherein each of the first and second riser attaching means comprise the release cable defined by a proximal end, a distal end, and an intermediate portion, the proximal end positioned for operation with a handle to be pulled for releasing the risers from the harness, the distal end slidably passing through the loop.

34. The rigging method according to claim 33, wherein the connecting step comprises the step of providing a connection ring and rotatably attaching the connection ring to the reserve static line for slidably receiving the second riser release cable therethrough.

35. The rigging method according to claim 34, further comprising the steps of:
 carrying the second release cable within a cable housing;
 extending the cable housing generally along the full cable length;
 providing an opening within the cable housing; and
 passing the connection ring through the opening for slidably receiving the cable.

36. The rigging method according to claim 33, wherein the connecting step comprises the step of affixing a proximal end of a lanyard to the first riser and affixing a distal end of the lanyard to the second riser release cable.

37. The rigging method according to claim 36, further comprising a grommet attached to the lanyard distal end, wherein the distal end affixing step includes the step of slidably receiving the second riser release cable through the grommet.

38. The rigging method according to claim 29, wherein the first and second parachutes comprise main and reserve parachutes, respectively.

39. A method for rigging a parachute assembly, which parachute assembly includes a first parachute releasably attached to a body harness through first and second attaching means connected between first and second risers of the first parachute and the body harness, and a second parachute having deployment means for deploying the second parachute, the method comprising the steps of:
 attaching a reserve static line between the first riser of the first parachute and the deploying means of a second parachute for deploying the second parachute upon failure of the first riser; and
 connecting the first riser of the first parachute to the second attaching means of the second riser for automatically releasing the second riser from the harness upon failure of the first riser and prior to the reserve static line deploying the second parachute.

40. The rigging method parachute according to claim 39, wherein the first riser connecting step comprises the step of providing a connector ring for connecting the reserve static line to the second attaching means.

41. The rigging method according to claim 39, wherein the first riser connecting step comprises the step of providing a lanyard having a proximal end fixedly attached to the first riser and a distal end slidably attached to the second attaching means.

42. The rigging method according to claim 39, wherein each of the first and second attaching means comprises:
 a first ring attached to the harness;
 a second ring rotatably attached to the riser, the second ring passing through the first ring for removably connecting the first ring and thus the harness to the riser;
 a third ring rotatably attached to the riser, the third ring operable with the second ring and passing through the second ring for removably securing the second ring;
 a loop passing through the third ring; and
 a release cable slidably passing through the loop for releasably securing the loop to the third ring, wherein the step of releasing the second riser includes the step of removing the cable from the loop for initiating serial releasing of the third and second rings from the first ring, thus releasing the second riser from the harness.

43. The rigging method according to claim 42, wherein each of the first and second riser attaching means comprise the release cable defined by a proximal end, a distal end, and an intermediate portion, the proximal end positioned for operation with a handle to be pulled for releasing the risers from the harness, the distal end slidably passing through the loop.

44. The rigging method according to claim 43, wherein the connecting step comprises the step of providing a connection ring and rotatably attaching the connection ring to the reserve static line for slidably receiving the second riser release cable therethrough.

45. The rigging method according to claim 44, further comprising the steps of:
 carrying the second release cable within a cable housing;
 extending the cable housing generally along the full cable length;
 providing an opening within the cable housing; and
 passing the connection ring through the opening for slidably receiving the cable.

46. The rigging method according to claim 43, wherein the connecting step comprises the step of affixing a proximal end of a lanyard to the first riser and affixing a distal end of the lanyard to the second riser release cable.

47. The rigging method according to claim 46, further comprising a grommet attached to the lanyard distal end, wherein the distal end affixing step includes the step of slidably receiving the second riser release cable through the grommet.

48. The rigging method according to claim 39, wherein the first and second parachutes comprise main and reserve parachutes, respectively.

* * * * *